H. C. HORNBECK.
INCLINOMETER.
APPLICATION FILED JUNE 16, 1920.
1,426,645.
Patented Aug. 22, 1922.
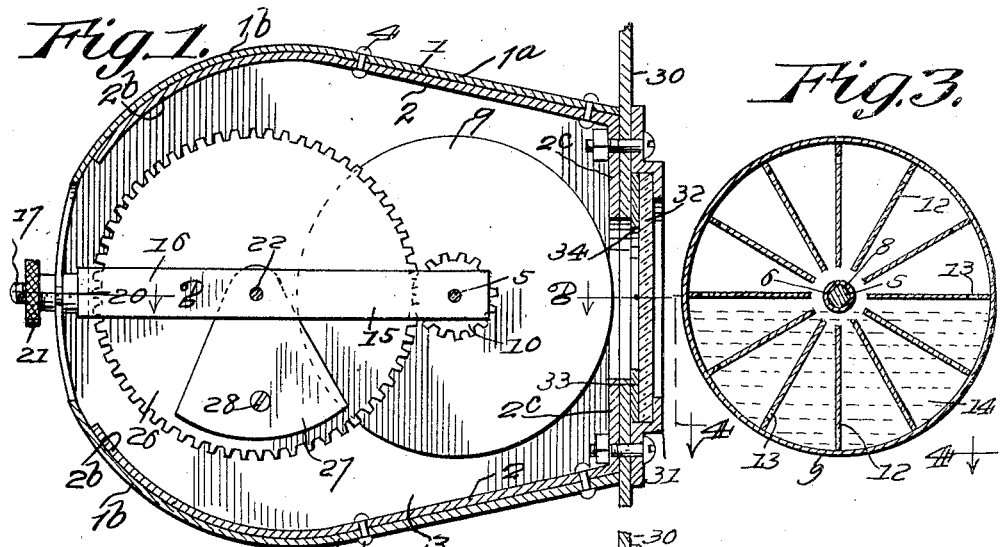
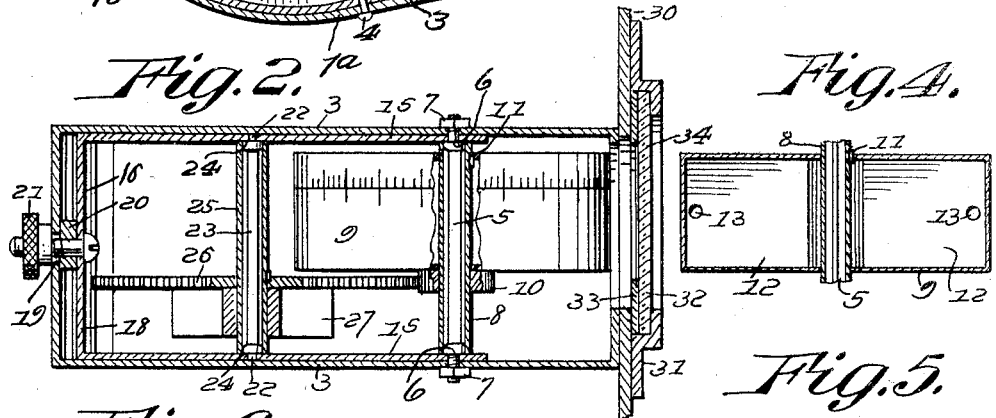
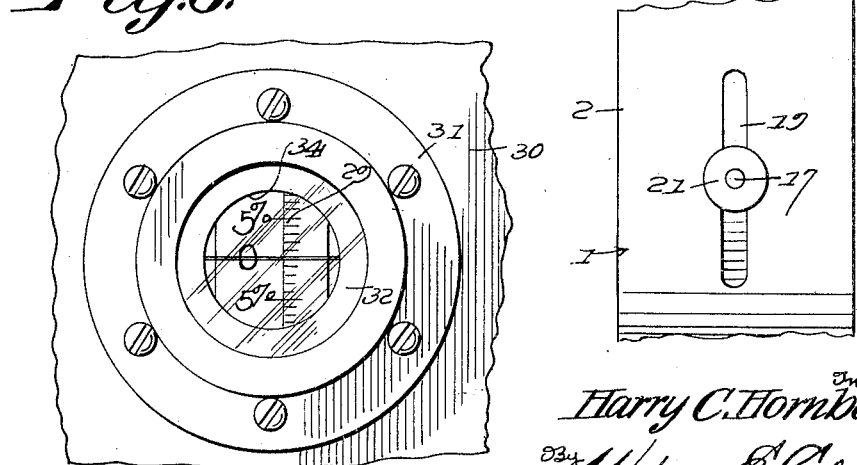
Harry C. Hornbeck,
By Watson E. Coleman
Attorney

UNITED STATES PATENT OFFICE.

HARRY C. HORNBECK, OF SAN BERNARDINO, CALIFORNIA.

INCLINOMETER.

1,426,645. Specification of Letters Patent. Patented Aug. 22, 1922.

Application filed June 16, 1920. Serial No. 389,528.

*To all whom it may concern:*

Be it known that I, HARRY C. HORNBECK, a citizen of the United States, residing at San Bernardino, in the county of San Bernardino and State of California, have invented certain new and useful Improvements in Inclinometers, of which the following is a specification, reference being had to the accompanying drawings.

This invention relates to an improved inclinometer or grade indicator especially adapted for use on moving vehicles preferably automobiles and the like.

An object of the invention is to provide a device of this kind which will occupy comparatively small space and in which machine the oscillatory movements of the indicator drum or stabilizer may be geared up with an oscillatory weight member which when seeking the center of gravity will operate to move the drum or stabilizer to indicate the inclination of a grade, said stabilizer or drum being provided with graduations to cooperate with an indicator wire, to indicate the exact inclination of the road.

Another object is to provide a machine of this kind in which the movable parts are so geared relatively to each other and mounted as to prevent the irregularities of the grade or road bed from jarring the relative position of the indicator drum or stabilizer.

In other words, the stabilizer or indicator drum contains a fluid, the level of which is below the axis of the drum, and is so geared to an oscillatory weight member that when the weighted member is jarred owing to the irregularities in the road bed and endeavors to pendulate, the liquid (which constitutes a weight) in the indicator drum will counteract the weight of the oscillatory member and therefore the indicator drum will remain stable.

Still another object is to provide a machine of this kind including means for adjusting the interior working parts when the moving vehicle is on a level so as to correspond with the level of the road bed whereby the working parts will properly operate in order to indicate the proper inclination of the grade relatively to a horizontal level.

While the design and construction at present illustrated and set forth is deemed preferable it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a vertical sectional view through the improved inclinometer or indicator machine constructed in accordance with the invention, Figure 2 is a horizontal sectional view on line 2—2 of Figure 1, Figure 3 is a detail sectional view through the indicator drum or stabilizer, Figure 4 is a sectional view through the indicator drum at right angles to that shown in Figure 3, Figure 5 is a rear view of a portion of the casing of the inclinometer or indicator showing the means for holding the interior working parts in different adjusted positions relatively to a horizontal level; and Figure 6 is a face view of the inclinometer.

Referring to the drawings, 1 designates a casing which comprises the side plates 3, and 2 designates strengthening plates. The diverging walls 1$^a$ of the casing 1 merge into curved parts 1$^b$. The strengthening plates 2 merge into curved parts 2$^b$. These strengthening plates 2 and their curved parts 2$^b$ are secured to the walls 1$^a$ and their curved portions 1$^b$ by means of the rivets 4. The plates 2 are separate from the casing 1 and its walls 1$^a$ and furthermore the ends of the walls 1$^a$ terminate adjacent the instrument board 30 so that the right angle extensions 2$^c$ of the plates 2 are secured to the instrument board 30 thereby providing only one thickness of metal adjacent the instrument board around the side opening. Mounted in bearings of the side plates 3 is a shaft 5, the end portions of which are provided with integral shoulders 6 and these side plates 3 are held in position on the ends of the shaft 5 by means of the nuts 7. The plates 2 are of substantial width and act to support the walls 1$^a$ of the casing 1. A tubular sleeve 8 is rotatably mounted upon the shaft 5 engaging upon the shoulders 6 to reduce the friction to a minimum. An indicator drum or stabilizer 9 is movable with the tubular shaft and also movable with the drum is a gear 10. By means of the key 11, the indicator drum or stabilizer (which is hollow) is fastened to the tubular shaft 8. The indicator drum or stabilizer has a plurality of radial partitions 12 having openings 13 and contained in the drum is a suitable fluid such as some suitable oil or the like acting as a weight and adapted to flow back and forth through the various compartments between the partitions owing to the openings 13. Pivotally mounted on the shaft 5 between the shoulders 6 and the side plates 3 of the casing are the arms 15 of the U-shaped cradle 16. A screw 17 is carried by the rear part of the cradle, in fact the transverse part 18 thereof and this screw engages through a slot 19 in the rear of the casing. A collar 20 is interposed between the rear of the casing and the transverse part 18 of the cradle so as to keep the parts spaced. It will be noted that the rear part of the casing is arcuately shaped, and whose radius extends from the shaft 5, therefore it will be noted that the cradle 16 can be adjusted and when adjusted it may be held in any desired position by tightening up on the thumb screw 21 thereby clamping the rear arcuately shaped part of the casing between the collar 20 and the thumb nut. The adjustment of the cradle is desired when the vehicle is positioned on a level grade so that an inclination in the grade will be properly indicated relatively to a horizontal level.

Mounted in bearings of the arms 15 of the cradle are the ends 22 of a shaft 23. This shaft 23 is provided with integral shoulders 24, and with which a tubular shaft 25 engages. In other words the tubular shaft 25 revolves about the collars 24 which is provided for reducing the friction to a minimum. Keyed upon and rotatable with the tubular shaft 25 is a gear 26 and carried by one face of the gear 26 is a weight or gravity member 27 which is secured to the gear as by means of the screw 28. The tubular shaft also passes through the weight or gravity member so as to hold the member in position. The gear 26 meshes with the gear 10 of the tubular shaft 8. It will be noted that when the vehicle is at rest on a level and the interior working parts have been adjusted, the weighted gear 26 will oscillate when the vehicle has been started and reaches an inclined grade either upward or downward.

The oscillating movement of the gear 26 will transmit movement to the gear 10 and thence to the indicator drum or stabilizer. The pendulation of the weight is the effect of the road shocks to be counteracted. The stabilizer 9 allows the weight 27 to move slowly, but not to make sudden movements. In addition to the weight of 14, the fluid surges frictionally against the sides and cylindrical walls and the partitions 12 with each shock of the weight 27 thereby acting to counteract road shocks.

The cylindrical surface of the indicator drum is provided with suitable graduations 29 which are numbered from a point indicated as zero in opposite directions to a point substantially ninety degrees from the zero indication so that when the vehicle is travelling upgrade or downgrade, the indicator drum will oscillate in either direction and through the medium of the graduations cooperating with the pointer or indicator, the exact inclination of the road bed may be indicated.

The casing 1 of the inclinometer may be mounted on a suitable instrument board 30 or upon any other part of the vehicle, and secured to the instrument board or to the part of the vehicle is a casing 31 for holding a glass or other transparent member 32 in position so that the cylindrical surface of the indicator cylinder or stalibizer may be observed. A suitable filler or packing 33 is interposed between the glass and the face of the instrument board 30 so as to cushion the glass and prevent movement thereof. The filler or cushioning member 33 is provided with a circular opening 34 through which the graduations on the cylindrical surface of the indicator cylinder may be seen and across which the indicator wire or pointer is arranged. In other words the wire or indicator pointer extends radially across the center of the opening and is secured in any suitable manner at diametrically opposite portions of the opening 34.

The invention having been set forth, what is claimed as new and useful is:—

1. In a grade indicator, a casing adapted to be fastened on a vehicle and having an opening provided with a transparent covering, an indicator cylinder mounted to oscillate in the casing and provided with a plurality of radial baffles and liquid partially filling the cylinder to damp the oscillation of the cylinder, means for supporting said cylinder, a cradle mounted upon the supporting means, a gravity actuated gear mounted on the cradle and having operative connections with the cylinder, whereby the gear may seek a stable position with regard to its center of gravity, so that the cylinder may indicate the angle of inclination of the grade.

2. In a gradometer, a casing to be fastened on a vehicle, and having an opening provided with a transparent covering, an indicator cylinder mounted to oscillate in the casing and provided with a plurality of radial baffles and liquid partially filling the cylinder to damp the oscillation of the cylinder, means for supporting said cylinder, a cradle mounted upon the supporting means, a gravity actuated gear mounted on the cradle and having operative connections with the cylinder to impart movement thereto, whereby the gear may seek a stable position with respect to its center of gravity, to cause the cylinder to indicate an angle of inclination of the grade, and means for holding the cradle in different adjusted positions.

3. In an inclinometer, a casing, an indicator drum rotatably mounted therein, vanes on the interior of the indicator drum, a supporting shaft therefor, means actuated by gravity and cooperative with the vanes whereby to damp the oscillation of the drum, said drum having graduations, a gravity actuated gear operatively mounted in the casing and having operative connections with the drum, whereby the gear may transmit movement to the drum, and whereby the gear may seek a stable position with regard to its center of gravity, and to cause the drum to indicate the inclination of the grade, adjustable means mounted in the casing and pivoted on the supporting shaft and operatively carrying said gravity actuated gear, so as to adjust the working parts relatively to a horizontal level, and means for holding the adjustable means in different positions relatively to the horizontal level.

4. In a gradometer, a casing, a supporting shaft mounted in bearings thereof, a cradle mounted on the shaft, a gravity actuated gear operatively mounted on the cradle in a position at one side of the supporting shaft, a hollow indicator cylinder on the supporting shaft and being operatively connected with said gear, whereby movement may be imparted to the cylinder, means on the interior of the cylinder to damp the oscillation of the cylinder and the gear, said cylinder having graduations thereon from zero in opposite directions toward ninety degrees.

5. In a gradometer, a casing, a supporting shaft mounted in bearings thereof, a cradle pivotally mounted on the shaft, a gravity actuated gear operatively mounted on the cradle in a position to one side of the supporting shaft, a hollow indicator cylinder, means within the cylinder to damp its oscillation, said cradle being adapted to provide for vertical adjustment between the gear and the cylinder, and means for holding the cradle in its adjusted positions in order to stabilize it with respect to the center of gravity of said gear.

In testimony whereof I hereunto affix my signature.

HARRY C. HORNBECK.